United States Patent [19]

Laster et al.

[11] Patent Number: 4,953,139
[45] Date of Patent: Aug. 28, 1990

[54] METHOD FOR RESTORING AND EXTRAPOLATING SEISMIC TRACES

[75] Inventors: Stanley J. Laster, Dallas; Robert A. Meek, Sanger; Thomas E. Shirley, Richardson, all of Tex.

[73] Assignee: Mobil Oil Corporation, New York, N.Y.

[21] Appl. No.: 474,886

[22] Filed: Feb. 5, 1990

[51] Int. Cl.$^5$ .......................... G01V 1/28; G01V 1/36
[52] U.S. Cl. ........................................ 367/73; 367/38; 364/421
[58] Field of Search ...................... 364/421; 367/38, 73

[56] References Cited

U.S. PATENT DOCUMENTS

| | | | |
|---|---|---|---|
| 4,829,487 | 5/1989 | Malloy | 367/40 |
| 4,860,265 | 8/1989 | Laster et al. | 367/73 |
| 4,884,248 | 11/1989 | Laster et al. | 367/73 |

Primary Examiner—Ian J. Lobo
Attorney, Agent, or Firm—Alexander J. McKillop; Charles J. Speciale; George W. Hager, Jr.

[57] ABSTRACT

A seismic record is enhanced through trace restoration and extrapolation. A set of traces surrounding a missing trace or adjacent an edge of the seismic record are transformed into the frequency domain using a fast Fourier transform. Each frequency of the resultant x-f representation a series of complex numbers, one corresponding to each trace, is selected. Autoregressive model coefficients are estimated for this complex series using a recursive least squares method. A complex number is estimated for trace restoration and extrapolation from the series of complex numbers and autoregressive coefficients. After all frequency components are thus processed restored or extrapolated traces are obtained by an inverse Fourier transform.

4 Claims, 3 Drawing Sheets

METHOD FOR RESTORING AND EXTRAPOLATING SEISMIC TRACES

BACKGROUND OF THE INVENTION

This invention relates to a method for restoring missing or noisy seismic traces to a seismic record. This invention further relates to extrapolating traces beyond the edges of a seismic record.

In seismic exploration, it is common practice to deploy a large array of geophones on the surface of the earth and to record the vibrations of the earth at each geophone location to obtain a collection of seismic traces, commonly referred to as a seismic record. When the vibrations so recorded are caused by a seismic source activated at a known time and location, the seismic record can be processed by a computer in known ways to produce an image of the subsurface. The image of the subsurface is commonly interpreted by geophysicists to detect the possible presence of valuable hydrocarbons.

Seismic traces are commonly recorded as digital samples representing the amplitude of received seismic signals as a function of time. Since seismic traces are usual obtained along a line of exploration on the surface of the earth, the digital samples can be formed into x-t arrays with each sample in the array representing the amplitude of the seismic signal as a function of horizontal distance and time. This collection of digital samples for one particular seismic source at one particular location is called a seismic record. When such seismic records are processed and visually reproduced, by plotting or the like, a seismic section is produced. A seismic section depicts the subsurface layering of a section of the earth. It is the principal tool which the geophysicist studies to determine the nature of the earth's subsurface formation. Before the seismic record can be converted into a seismic section for interpretation by geophysicists, the seismic record must be extensively processed to remove noise and to make reflection events discernible.

A common problem during seismic data acquisition is the presence of seismic traces with no recorded data or seismic traces that clearly contain severe noise contamination. For example, the failure of one of more geophones intended to collect data can result in a seismic trace without data. Standard practice among geophysicists faced with seismic traces with no recorded data or severely contaminated seismic traces has been to exclude such traces, commonly referred to as "null" traces, from the otherwise satisfactory data set. The collected seismic data would be processed normally without the excluded data.

Missing traces in seismic records may create noise when the data is processed. F-k filters used to remove large coherent noises, such as multiples and direct arrivals, create processing noise in the vicinity of the missing traces. Dip movement, another prestack process, creates processing noise where seismic events cross over null traces. In the slant stack domain null traces appear as linear noise, which may degrade the performance of other processes applied in this domain. Processing noise from missing traces may make reflection events less discernible, thereby adversely affecting prestack interpretation or interpretation of final stack sections. It is therefore desirable to restore missing traces before additional processing.

Various techniques have been applied to seismic records in an attempt to solve the problem of missing traces as described above. In U.S. Pat. No. 4,884,248 to Laster, Meek and Shirley, a seismic record is transformed into a data localizing space and muted to retain only the localized data components of the seismic record. The muted data is inverse-transformed into the x-t domain to produce first estimates of the seismic data to be restored. The first estimates of the restored data are substituted for the corresponding traces in the original seismic record. Fully restored traces corresponding to the missing or severely noise contaminated traces are determined from the single estimate of the restored traces.

In U.S. Pat. No. 4,860,265 to Shirley, Meek and Laster, a seismic record is transformed from the x-t domain to the f-k domain by a series of fast Fourier transforms. The f-k transform of the seismic record is filtered to retain only coherent events and the filtered transform is inverse-transformed back to the x-t domain. A first determination of the restored trace corresponding to the null trace is selected and substituted for the null trace. The first determination of the restored trace is used to determine a fully restored trace.

In U.S. Pat. No. 4,829,487 to Malloy, a null trace to be restored, as well as adjoining traces on each side of the null trace, are selected. A series of cross-correlations are determined for all points on the null trace. Restoration of data points is conducted by transforming the series of points of the adjacent traces corresponding to the maximum cross-correlation for the point into a Fourier representation, zero-padding the Fourier representation and producing a restored data point by inverse Fourier transforming the zero-padded data representation. The procedure is repeated for each point along the trace being restored. The procedure interpolates a trace between two original traces without altering the original data.

SUMMARY OF THE INVENTION

The present invention is directed to a new and improved method for restoring missing or noisy seismic traces and for extrapolating traces beyond the edges of a seismic record.

In one aspect, a group of seismic traces are selected surrounding an identified seismic trace to be restored in an x-t domain seismic record. These selected traces are transformed into the f-x domain by the application of a fast Fourier transform. For each frequency a series of complex numbers is selected corresponding to the traces in f-x space. A set of autoregressive coefficients is estimated from the series of complex numbers. A complex number is estimated for the identified trace from the autoregressive coefficients and the series of complex numbers on either side of the identified trace. After repeating the foregoing for a plurality of frequencies in the f-x domain, an inverse fast Fourier transform is applied for the estimated complex numbers for the plurality of frequencies to produce restored seismic data for the identified trace in the x-t domain seismic record.

In a further aspect, a group of traces are selected at an edge of the x-t domain seismic record which is to be extrapolated thus producing a number of additional traces. The selected traces are transformed into the f-x domain by the application of a fast Fourier transform. A series of complex numbers is selected for each frequency along the selected traces in f-x space. A set of autoregressive coefficients is estimated from the series of complex numbers. A complex number is estimated for the extrapolation off the edge of the seismic record from the series of complex number and autoregressive coefficients. After repeating the foregoing for a plurality of frequencies in the f-x domain, an inverse fast Fourier transform is applied for the estimated complex number for the plurality of frequencies to produce new seismic data for extrapolation off the selected edge of the seismic record.

DESCRIPTION OF THE PREFERRED EMBODIMENT

Figure 1:
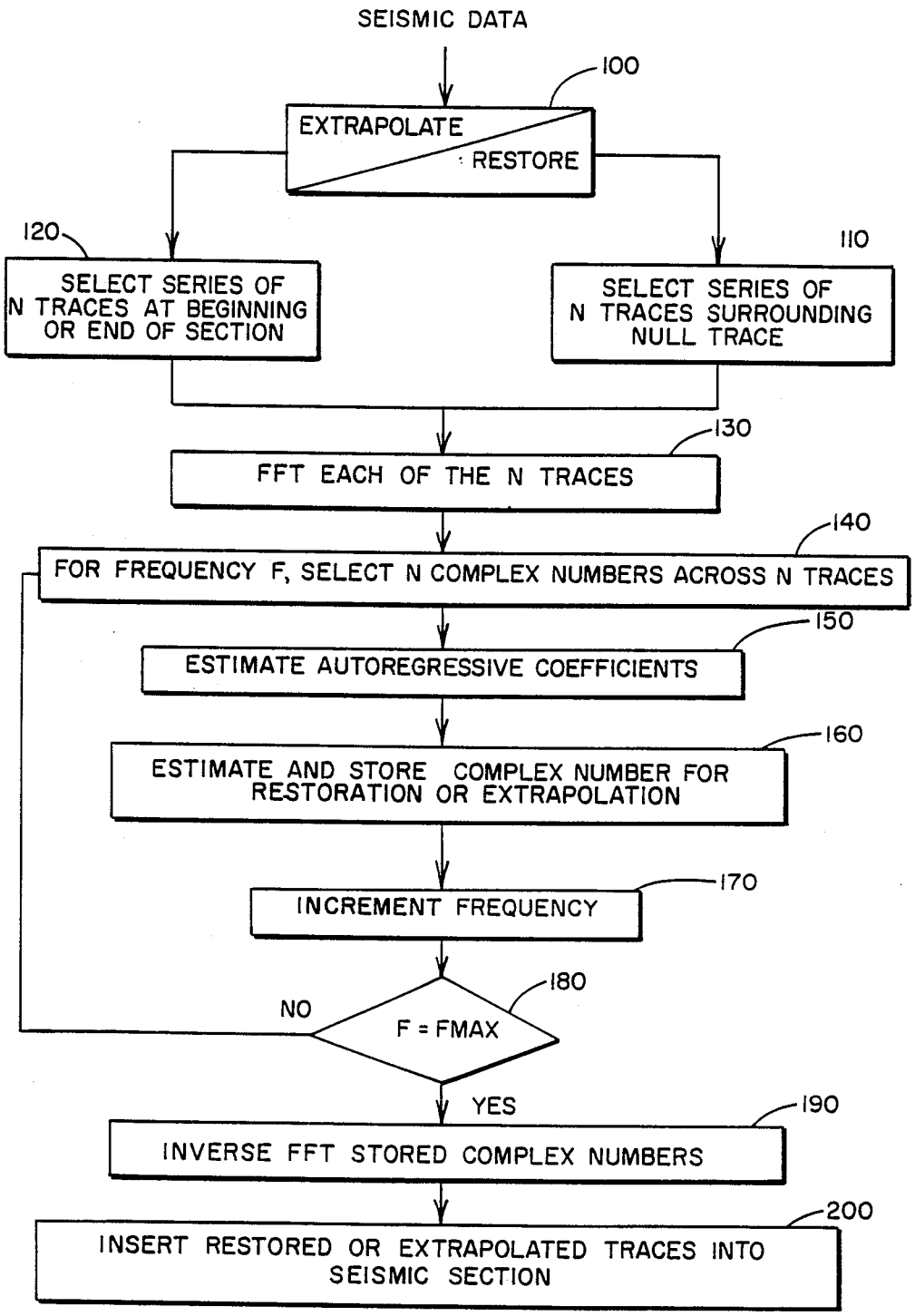
FIG. 1 illustrates an algorithm, in flow chart form, for restoring missing traces in accordance with the method of the present invention.

Referring to FIG. 1, seismic data, gathered using conventional means, is selected at step 100 for either missing or null trace restoration or end trace extrapolation. If a null trace needs to be restored, a series of N traces surrounding and including the missing trace on the seismic section are selected at step 110. In the alternative, if a trace at the edge of the seismic record needs to be extrapolated, a series of N traces adjacent the edge of the seismic section are selected at step 120.

Proceeding to step 130, each of the N traces selected are transformed to f-x space via a Fast Fourier transform (FFT), represented by the following equation:

$$X(f) = \int_{-\infty}^{\infty} x(t)e^{-j2\pi ft} dt \quad (1)$$

where x(t) is the set of time samples for each trace and X(f) is its representation in the frequency domain. It will be recognized that equation (1) describes the mathematical process of Fourier transformation, not the FFT. The actual embodiment of the invention will use a standard FFT subroutine.

The FFT produces a set of complex numbers which are related to the phase and amplitude of harmonically related sinusoids comprising the time series.

Proceeding to step 140 for each frequency in the x-f domain a set of N complex numbers, each associated with a single trace, is selected. This sequence including the spatial sample, $X_m$, associated with a missing or extrapolated trace. For a missing trace $X_m$32 0.

At step 150 the p autoregressive (AR) coefficients are estimated for this complex series using a recursive least squares method known as the Burg algorithm, modified to use only segments of the data on either side of the spatial sample, to estimate the AR coefficients. It is assumed that the complex series on either side of the sample can be modeled by an autoregressive sequence:

$$X_n = \sum_{k=1}^{p} a_k X_{n-k} + \mu_n \quad (2)$$

where; $X_n$ is the complex sequence associated with each trace for each frequency; $a_k$ are the set of AR coefficients estimated for this sequence; and $\mu_n$ is the white noise associated with this sequence.

This model, which can also be viewed as a sum of p nonharmonically related sinusoids, is applicable because seismic data is composed of a finite number of coherent events which, when transformed into f-x space and viewed along the spatial direction for a few traces, appear as distinct spatial sinusoids for each frequency component.

The modified Burg technique uses forward and backward linear prediction error operators which are defined by:

$$e_{pn} \sum_{k=0}^{p} a_{pk} X_{n-k} \text{ when } n - k \neq m \quad (3)$$
$$e_{pn} = 0 \quad \text{when } n - k = m$$

and $$b_{pn} = \sum_{k=0}^{p} a_{pk}^* X_{n-p+k} \text{ when } n - p + k \neq m \quad (4)$$
$$b_{pn} = 0 \quad \text{when } n - p + k = m$$

for $p > n \leq N/2 - 1$, where $\alpha_{po}=0$. The sum of the forward and backward prediction error energies:

$$e_p = \sum_{n=p}^{N-1} |e_{pn}|^2 + \sum_{n=p}^{N-1} |e_{pn}|^2 \text{ for } p \leq n \leq N/2 - 1 \quad (5)$$

may be minimized subject to the constraint that the prediction parameters, $a_{pk}$, satisfy the Levinson recursion:

$$a_{pk} = a_{p-1,k} + a_{pp} a_{p-1,p-k} \quad (6)$$

for all orders from 1 to p, thus yielding the relationship $$a_{ii} = \frac{-2 \sum_{k=i}^{N-1} b_{i-1,k-1}^* e_{i-1,k}}{\sum_{k=i}^{N-1} |b_{i-1,k-1}|^2 + |e_{i-1,k}|^2} \quad (7)$$

from which the AR coefficients can be found.

At step 160 the complex spatial samples $X_m$, associated with a missing trace is estimated by using the AR coefficients and the complex sequence on either side of the missing sample:

$$X_m = \sum_{k=1}^{p} \frac{a_k^*}{2} X_{m+k} + \sum_{k=1}^{p} \frac{a_k}{2} X_{m-k}. \quad (8)$$

If extrapolated traces are desired the following equation is used to estimate the N+1 complex number $$X_{N+1} = \sum_{k=1}^{p} a_k X_{N+1-k}. \quad (9)$$

The new estimated complex number is then stored for further use. At step 170 the frequency is incremented by one. At step 180 is more frequencies are needed the algorithm proceeds back to step 140; if not the algorithm proceeds to step 190. The maximum frequency, Fmax, is usually the Nyquist frequency, $F_{nyq} = 1/(2\Delta t)$, where $\Delta t$ is the sample internal in time.

At step 190 the stored complex series associated with the missing or extrapolated trace is inverse Fourier transformed:

$$x(t) = \int_{-\infty}^{\infty} X(f) e^{j2\pi ft} dt \tag{10}$$

back into the time domain resulting in a new trace. The new trace is then inserted into the record at step 200.

Figure 2:
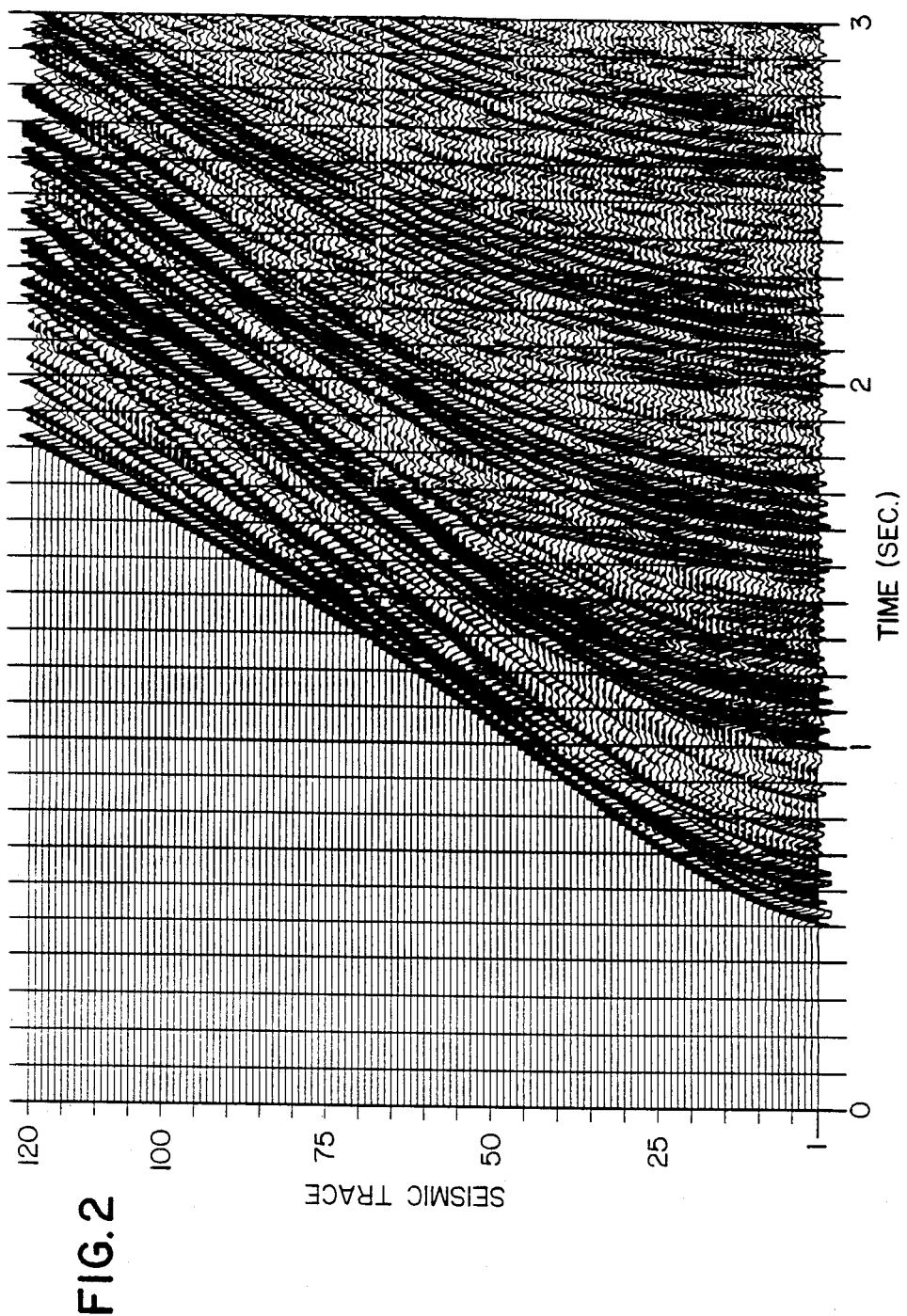
FIG. 2 illustrates a x-t domain seismic record containing a missing trace produced by conventional seismic exploration along a line of exploration.
Figure 3:
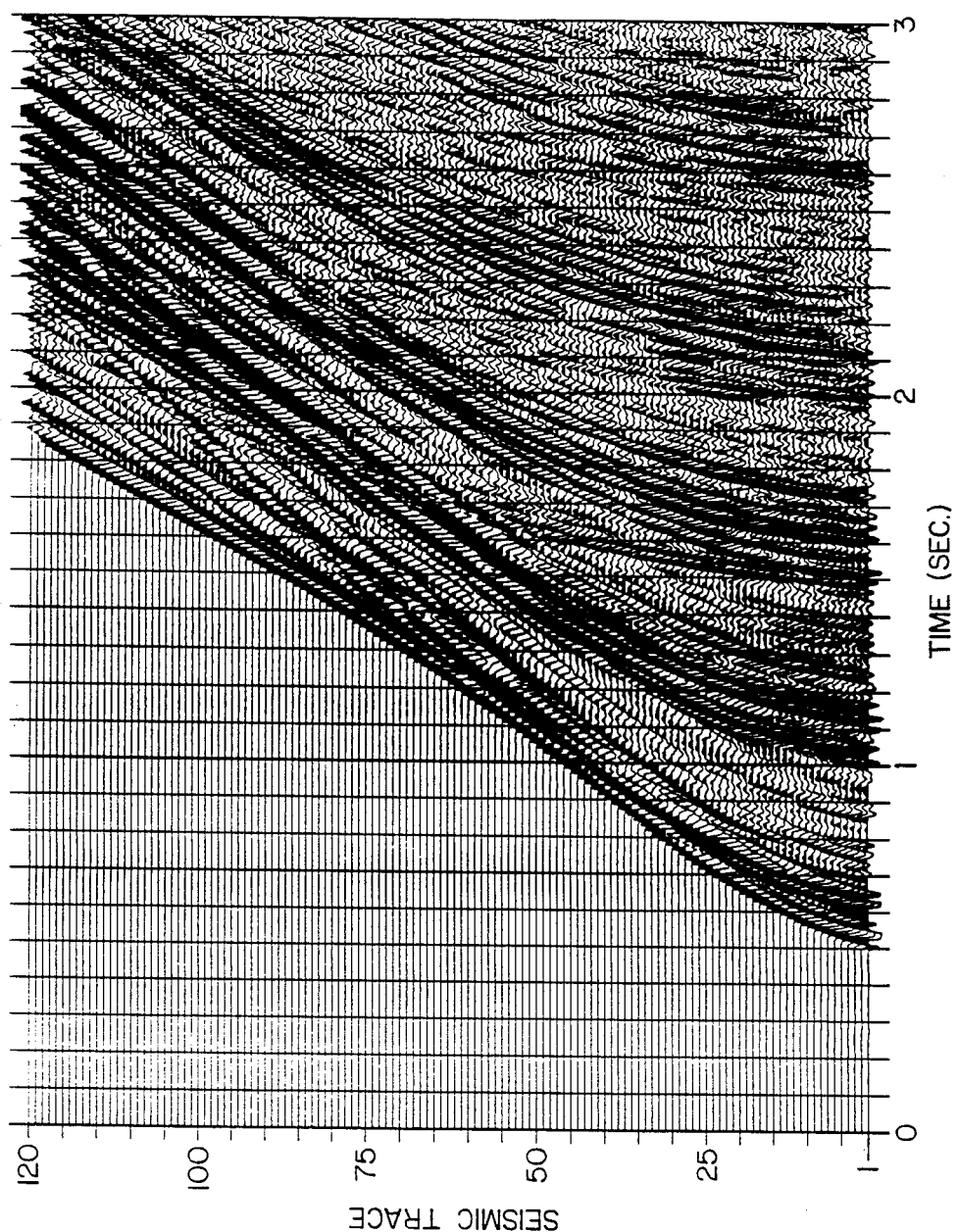
FIG. 3 illustrates a x-t domain seismic record after application of this method to restore the missing trace and extrapolate five traces beyond the edge of the record.

FIG. 2 illustrates a x-t domain seismic record having a missing, or null, trace 67 and end trace 120. After applying the algorithm of FIG. 1 to this seismic record the new x-t domain seismic record of FIG. 3 was produced with trace 67 restored and end trace 120 extrapolated beyond the edge of the record through now trace 125.

Having now described a preferred embodiment of the present invention for restoring missing or null seismic traces, as well as extrapolating a trace beyond the edge of the record, it is to be understood that various alternations or modifications may be made without departing from the spirit and scope of the invention as set forth in the appended claims.

What is claimed is:

1. A method for enhancing a x-t domain seismic record comprising the steps of:
    (a) identifying a null seismic trace for restoration;
    (b) selecting a group of traces surrounding said identified null seismic trace to be restored on said x-t domain seismic record;
    (c) transforming said group of selected traces into the f-x domain by the application of a fast Fourier transform;
    (d) selecting a series of complex numbers corresponding to the selected traces for each frequency component;
    (e) estimating a set of autoregressive coefficients from said series of complex numbers;
    (f) estimating a complex number for the missing number associated with the identified null trace from said series of complex numbers and autoregressive coefficients on either side of the missing number;
    (g) repeating step (d) through (f) for a plurality of frequencies in the f-x domain and
    (h) applying an inverse fast Fourier transform to the estimated complex numbers for said plurality of frequencies to produce restored seismic data for identified seismic traces on said x-t domain street record.

2. A method for enhancing a x-t domain seismic record comprising the steps of:
    (a) identifying a null seismic trace for restoration;
    (b) selecting a group of traces surrounding said identified seismic trace to be restored on said x-t domain seismic record;
    (c) transforming each of the selected traces into f-x space by the application of a fast Fourier transform represented by the following expression:

$$X(f) = \int_{-\infty}^{\infty} x(t) e^{j2\pi ft} dt$$

where:
    x(t) is the set of time samples for each trace, and
    X(f) is the trace representation in the frequency domain;
    (d) selecting a set of complex numbers for each frequency in the x-f domain associated with the selected traces, including a missing spatial sample associated with the identified trace,
    (e) estimating a set of autoregressive coefficients for said set of complex numbers by the application of a recursive least squares method using segments of seismic data on either side of the spatial sample to be restored, where the complex series on either side of the spatial sample is modeled by the following autoregressive sequence:

$$X_n = \sum_{k=1}^{p} a_k X_{n-k} + \mu_n$$

where:
    $X_n$ is the complex sequence associated with each trace for each frequency;
    $a_k$ are the set of autoregressive coefficients estimated for the sequence; and
    $\mu_n$ is the white noise associated with this sequence;
    (f) estimating a complex spatial sample, $X_m$, associated with said identified trace by using the autoregressive coefficients and the complex sequence on either side of the spatial sample in accordance with the following expression:

$$X_m = \sum_{k=1}^{p} \frac{a_k^*}{2} X_{m+k} + \sum_{k=1}^{p} \frac{a_k}{2} X_{m-k};$$

(g) incrementing the frequency and repeating steps (d)–(f);
    (h) creating a restored seismic trace by inverse fast Fourier transform of the complex series associated with the identified trace back into the time domain represented by the following expression:

$$x(t) = \int_{-\infty}^{\infty} X(f) e^{j2\pi ft} df;$$

and
    (i) replacing said identified trace in said x-t domain seismic record with said restored seismic trace.

3. A method for enhancing a x-t domain seismic record section, comprising the steps of:
    (a) selecting a group of traces at the edge of said x-t domain seismic record to be extrapolated with a number of traces;
    (b) transforming said group of selected traces into the f-x domain by the application of a fast Fourier transform;
    (c) selecting a series of complex numbers for each frequency along each selected trace in f-x space,
    (d) estimating a set of autoregressive coefficients from said series of complex numbers;
    (e) estimating a complex number to be extrapolated off said edge of the seismic record from said series of complex numbers and autoregressive coefficients;
    (f) repeating steps (c)–(e) for a plurality of frequencies in the f-x domain; and
    (g) applying an inverse fast Fourier transform to the extrapolated complex numbers for said plurality of frequencies to produce new extrapolated seismic traces off the selected edge of said seismic record.

4. A method for enhancing a x-t domain seismic record section, comprising the steps of:

(a) selecting a group of traces at the edge of said x-t domain seismic record to be extrapolated with a number of traces, (b) transforming each of the selected traces in f-x space by the application of a fast Fourier transform represented by the following expression:

$$X(f) = \int_{-\infty}^{\infty} x(t)e^{-j2\pi ft}dt$$

wherein:

x(t) is the set of time samples for each trace, and (X)f is the trace representation in the frequency domain; said transform producing a set of complex numbers related to the phase and amplitude of harmonically related sinusoids comprising the time series;

(c) selecting a series of complex numbers for each frequency along each selected trace in f-x space;

(d) estimating a set of autoregressive coefficients for said set of complex numbers by the application of a recursive least squares method where the complex series is modeled by the following autoregressive sequence;

$$X_n = \sum_{k=1}^{p} a_k X_{n-k} + \mu_n$$

where:

$X_n$ is the complex sequence associated with each trace for each frequency;

$a_k$ is the set of autoregressive coefficients estimated for the sequence; and $\mu_n$ is the white noise associated with this sequence;

(e) estimating a complex spatial sample $X_{n+1}$, for trace extrapolation by using autoregressive coefficients and the complex sequence in accordance with the following expression:

$$X_{N+1} = \sum_{k=1}^{p} a_k X_{N+1-k};$$

(f) incrementing the frequency and repeating steps (c)-(e);

(g) creating new seismic traces by inverse fast Fourier transform of the complex series back into the time domain represented by the following expression:

$$x(t) = \int_{-\infty}^{\infty} X(f)e^{j2\pi ft}df, \text{ and}$$

(h) extrapolating the edge of said seismic record section in the x-t domain with said new seismic traces.

* * * * *

UNITED STATES PATENT AND TRADEMARK OFFICE
CERTIFICATE OF CORRECTION

PATENT NO. : 4,953,139

DATED : August 28, 1990

INVENTOR(S) : Stanley J. Laster, et al

It is certified that error appears in the above-identified patent and that said Letters Patent is hereby corrected as shown below:

Col. 5, line 65, equation: should be "$X(f) = \int_{-\infty}^{\infty} x(t) e^{-j2\pi ft} dt$" (the "-" before the "j" is missing)

Signed and Sealed this

Fourteenth Day of January, 1992

*Attest:*

HARRY F. MANBECK, JR.

*Attesting Officer*    *Commissioner of Patents and Trademarks*